United States Patent [19]

Tanizoe

[11] Patent Number: 5,138,283

[45] Date of Patent: Aug. 11, 1992

[54] OSCILLATION FREQUENCY CONTROL CIRCUIT

[75] Inventor: Hideki Tanizoe, Nagasaki, Japan

[73] Assignee: Mitsubishi Denki Kabushiki Kaisha, Tokyo, Japan

[21] Appl. No.: 808,777

[22] Filed: Dec. 17, 1991

[30] Foreign Application Priority Data

Dec. 27, 1990 [JP] Japan ................................ 2-408172

[51] Int. Cl.$^5$ ............................................. H03L 7/00
[52] U.S. Cl. ........................................ 331/14; 331/20; 331/34; 358/158
[58] Field of Search ................. 331/1 R, 14, 16, 18, 331/20, 25, 34; 358/148, 158, 337

[56] References Cited

U.S. PATENT DOCUMENTS

| 4,203,076 | 5/1980 | Yamashita | 331/20 |
| 4,660,080 | 4/1987 | Dietz et al. | 331/20 |
| 4,858,008 | 8/1989 | Sieben et al. | 331/20 |
| 4,884,040 | 11/1989 | Fling | 358/158 |

FOREIGN PATENT DOCUMENTS 63-105581 5/1988 Japan .
1-208079 8/1989 Japan .

Primary Examiner—Robert J. Pascal
Attorney, Agent, or Firm—Burns, Doane, Swecker & Mathis

[57] ABSTRACT

An oscillation frequency control circuit which, while activating normal operation mode, initially computes a frequency control data corresponding to horizontal synchronizing signal by applying an interpolation on the basis of the frequency control data read from a memory and the frequency of horizontal synchronizing signal supplied to a display unit, and then, based on the computed result, automatically and internally controls the oscillation frequency of a horizontal oscillation circuit in accordance with the frequency of input horizontal synchronizing signal. On the other hand, when activating corrective operation mode, the control circuit initially detects the frequency of flyback pulse of a horizontal deflection circuit at the moment of supplying the frequency control data corresponding to the frequency of certain horizontal synchronizing signal to the horizontal oscillation circuit, and then automatically corrects the frequency control data in order that the difference between the detected result and the frequency of certain horizontal synchronizing signal can constantly be suppressed below a predetermined value.

6 Claims, 8 Drawing Sheets

Fig. 3
Prior Art

| COUNTED NUMBER Fh | CONTROL DATA DA |
|---|---|
| $Fh_{min}$ | $DA_{min}$ |
| $Fh_n$ | $DA_n$ |
| $Fh_{max}$ | $DA_{max}$ |

$$DATA = \frac{Refmax - Refmin}{Fimax - Fimin} \times (Fin - Fimin) + Refmin$$

OSCILLATION FREQUENCY CONTROL CIRCUIT

BACKGROUND OF THE INVENTION

1. Field of the Invention

The present invention relates to an oscillation frequency control circuit which constantly and precisely controls the oscillation frequency of a horizontal oscillation circuit of a display unit in accordance with the frequency of an input horizontal synchronizing signal.

2. Description of Related Art

FIG. 1 schematically designates a block diagram of a conventional oscillation frequency control circuit in conjunction with a peripheral circuit available for a display unit. The reference numeral 21 shown in FIG. 1 designates a one-chip microcomputer incorporating a counter, a timer, a ROM, and a RAM. The microcomputer 21 further incorporates a pair of input terminals H and V and three output terminals DA1 through DA3. These input terminals H and V respectively receive horizontal synchronizing signal HS and vertical synchronizing signal VS. The horizontal synchronization signal HS is also routed to a horizontal synchronizing circuit 31 via a switch 30.

Those output terminals DA1 through DA3 of the microcomputer 21 are respectively connected to input terminals CLK, DATA and LOAD of a digital-to-analog (D/A) converter IC 22. An inverted input terminal of a first operation amplifier 23 is connected to an output terminal OUT of the D/A converter IC 22 via a resistor 24. A resistor 25 is connected between the inverted input terminal and an output terminal of the first operation amplifier 23. The inverted input terminal of the first operation amplifier 23 is connected to a power-supply source Vcc via a variable resistor 26, whereas a non-inverted input terminal of the first operation amplifier 23 is connected to a reference power-supply source Vref.

The output terminal of the first operation amplifier 23 is connected to an inverted input terminal of a second operation amplifier 27 via a resistor 28. A variable resistor 29 is connected between the inverted input terminal and an output terminal of the second operation amplifier 27, whereas a non-inverted input terminal of the second operation amplifier 27 is connected to the reference power-supply source Vref. The output terminal of the second operation amplifier 27 is connected to a horizontal oscillation circuit 32.

Next, referring to the flowchart shown in FIG. 2, operation programmed by the microcomputer 21 is described below.

When the power is ON, program of the microcomputer 21 is activated and the initial step S21 is entered, in which horizontal synchronizing signal HS received via the input terminal H is counted for a predetermined period of time from the rear edge of vertical synchronizing signal VS received by the other input terminal V. FIG. 3 presents a table designating the corresponding relationship between the counted number Fh and a frequency control data DA. The data shown in this table is previously stored in the ROM of the microcomputer 21.

Next, step S22 is entered, in which the counted number is converted into a control data as per the table shown in FIG. 3, and then, step S23 is entered, in which the digital controlled data is supplied from those output terminals DA1 through DA3 to the D/A converter IC 22, and then, the analog-converted signal is supplied to the horizontal oscillation circuit 32 via the first and second operation amplifiers 23 and 27, and then the oscillation frequency of the horizontal oscillation circuit 32 is properly controlled in accordance with the frequency of the horizontal sychronizing signal HS.

It is ideal to arrange that frequency Fi of the input horizontal synchronizing signal HS and the output oscillation frequency Fo can enter into a relationship shown in FIG. 4 with a solid line. Those terms "Fimax" and "Fimin" respectively designate the maximum and minimum values of frequency range of the horizontal synchronizing signal HS. The oscillation frequency is properly controlled in order that the relationship Fomax=Fimax and Fomin=Fimin can be held constant.

Nevertheless, when individually operating respective products, due to unevenness of the constant in the oscillation circuits, deviation is unavoidably generated as shown in FIG. 4 with a broken line. To compensate for this, independent of the normal operation described above, an extra corrective operation for correcting the deviation must be executed. Those processes needed for correcting this deviation are described below.

Normally, the operation for correcting the above deviation is executed by applying a pair of variable resistors 26 and 29. FIG. 5 designates the input and output characteristics of the first and second operation amplifiers 23 and 27, where Vi designates input voltage and Vo output voltage. To correct the above deviation, initially, the switch 30 is released to prevent the horizontal synchronizing signal HS from being supplied to the horizontal synchronization circuit 31. Next, the horizontal synchronizing signal HS of the minimum frequency Fimin is supplied to the microcomputer 21, and then operates the variable resistor 26 so that the oscillation frequency can be equal to the Fomin, thus correcting the characteristic shown in FIG. 5. And, the horizontal synchronizing signal HS of the maximum frequency Fimax is supplied to the microcomputer 21, and then operates the variable resistor 2a so that the oscillation frequency can be equal to Fomax, thus correcting the characteristic shown in FIG. 5. After repeatedly executing these processes for several rounds, a desired characteristic of the oscillation frequency can be achieved.

Nevertheless, since any those conventional circuits for controlling the oscillation frequency is structured as described above, in order to fully eliminate unevenness of the circuit constant, any conventional device needs to install a circuit incorporating a plurality of operation amplifiers, and yet, the corrective operation must be executed via an external source. In consequence, circuit structure involves complexity, and yet, execution of the corrective process is annoyingly intricate and troublesome for the concerned.

SUMMARY OF THE INVENTION

The primary object of the invention is to provide a novel oscillation frequency control circuit capable of executing a corrective operation with using a simplified structure.

Another object of the invention is to provide a novel oscillation frequency control circuit capable of internally and automatically executing a corrective operation.

The oscillation frequency control circuit embodied by the invention, in the course of normal operation, initially computes a frequency control data corresponding to horizontal synchronizing signal on the basis of the frequency of the input horizontal synchronizing signal and another frequency control data read out of memory by applying an interpolation, and then supplies the computed data to a horizontal oscillation circuit so that the oscillation frequency of the horizontal oscillation circuit can properly be controlled. When activating a corrective operation, initially, the oscillation frequency control circuit embodied by the invention detects the frequency of flyback pulse outputted from a horizontal deflection circuit simultaneous with the delivery of the frequency control data corresponding to the maximum and minimum frequencies to the horizontal oscillation circuit, and finally corrects the frequency control data at its maximum and minimum levels so that the difference between the input and output frequencies at both levels can securely be diminished below a predetermined value.

The above and further objects and features of the invention will more fully be apparent from the following detailed description with accompanying drawings.

BRIEF DESCRIPTION OF THE DRAWINGS

FIG. 3 designates a table showing the corresponding relationship between the counted number Fh of the horizontal synchronizing signal HS and the frequency control data DA;

DESCRIPTION OF THE PREFERRED EMBODIMENTS

Referring now to the accompanying drawings, detail of the oscillation frequency control circuit according to an embodiment of the invention is described below.

Figure 1:
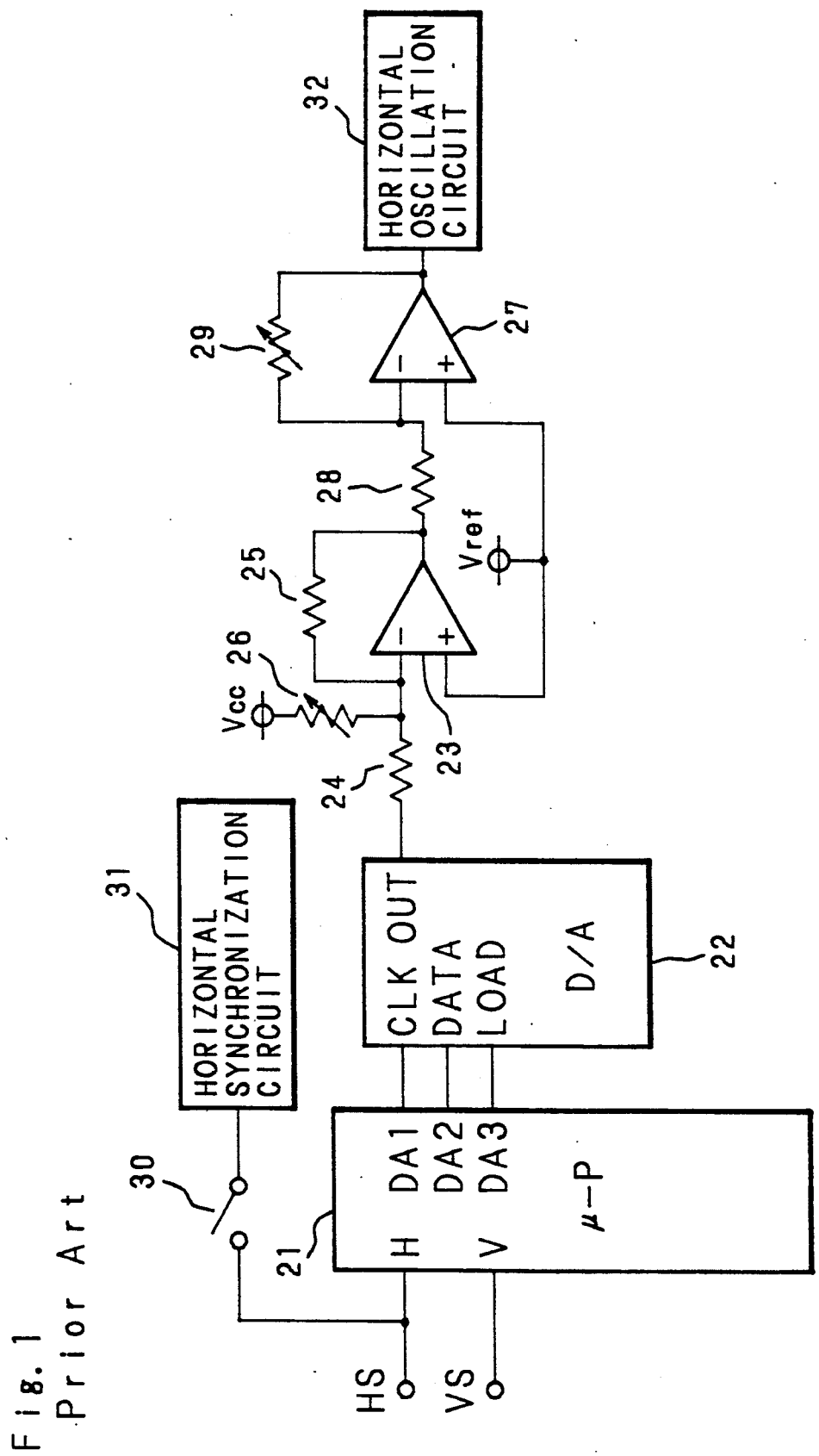
FIG. 1 schematically designates the block diagram of a conventional oscillation frequency control circuit and peripheral circuit.
Figure 2:
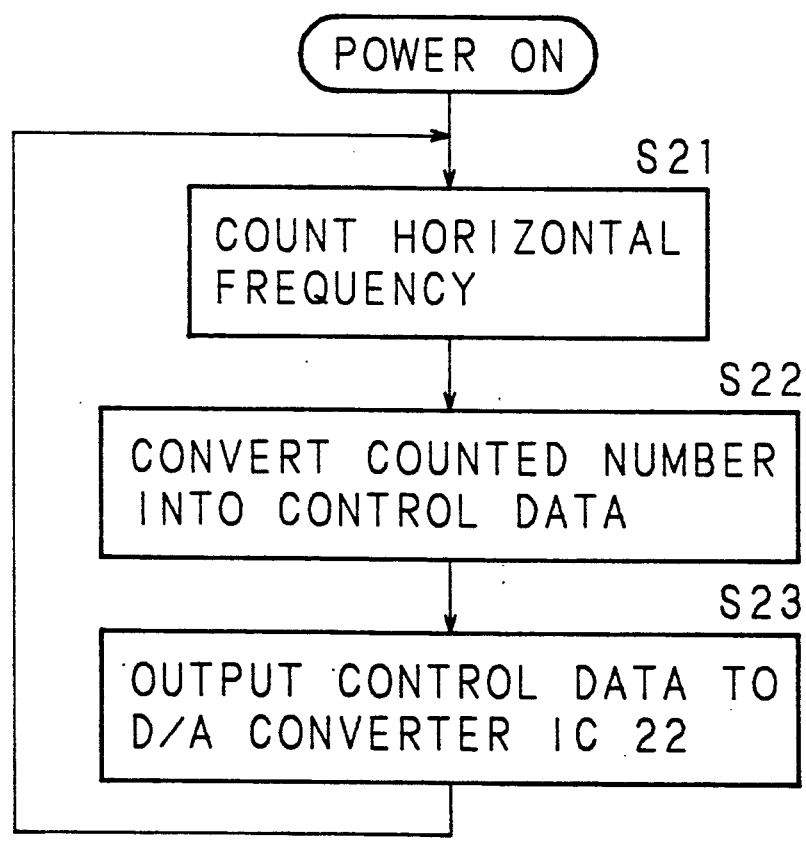
FIG. 2 designates an operating flowchart explanatory of the operation of the conventional circuit shown in FIG. 1.
Figure 4:
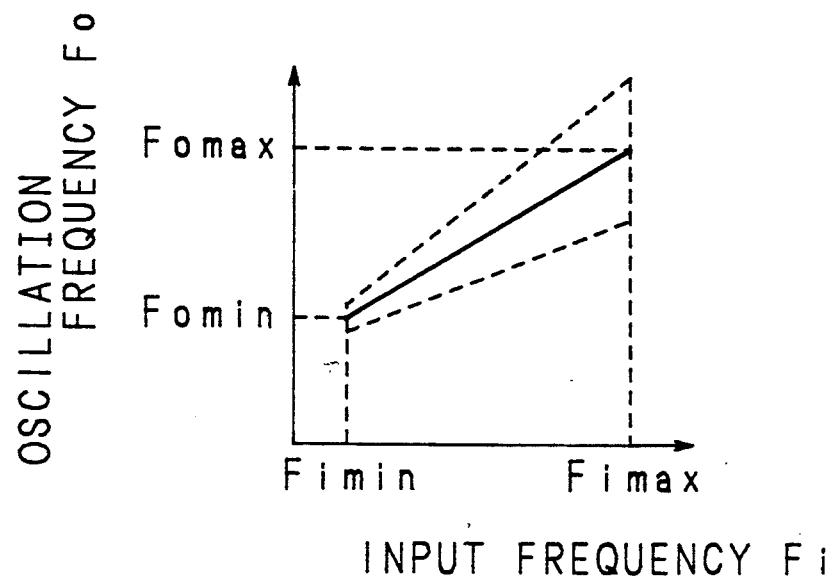
FIG. 4 graphically designates the relationship between the frequency Fi of the input horizontal synchronizing signal HS and the output oscillation frequency Fo.
Figure 5:
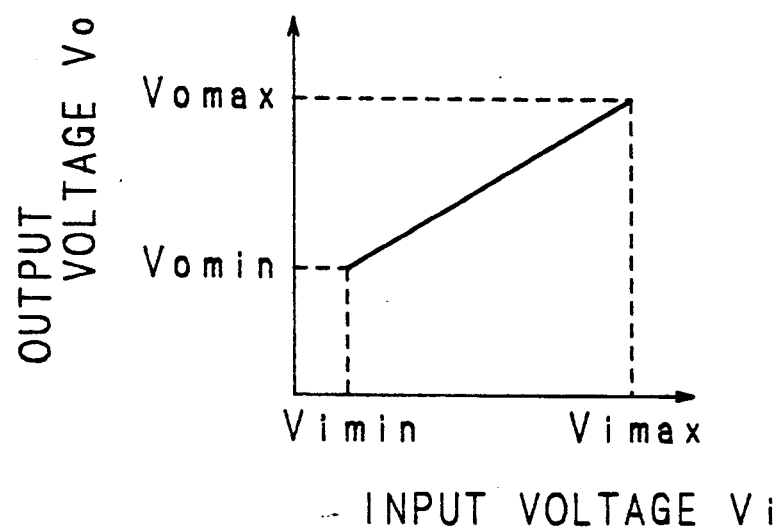
FIG. 5 graphically designates the relationship between the input and output voltage of those operation amplifiers shown in FIG. 1.
Figure 6:
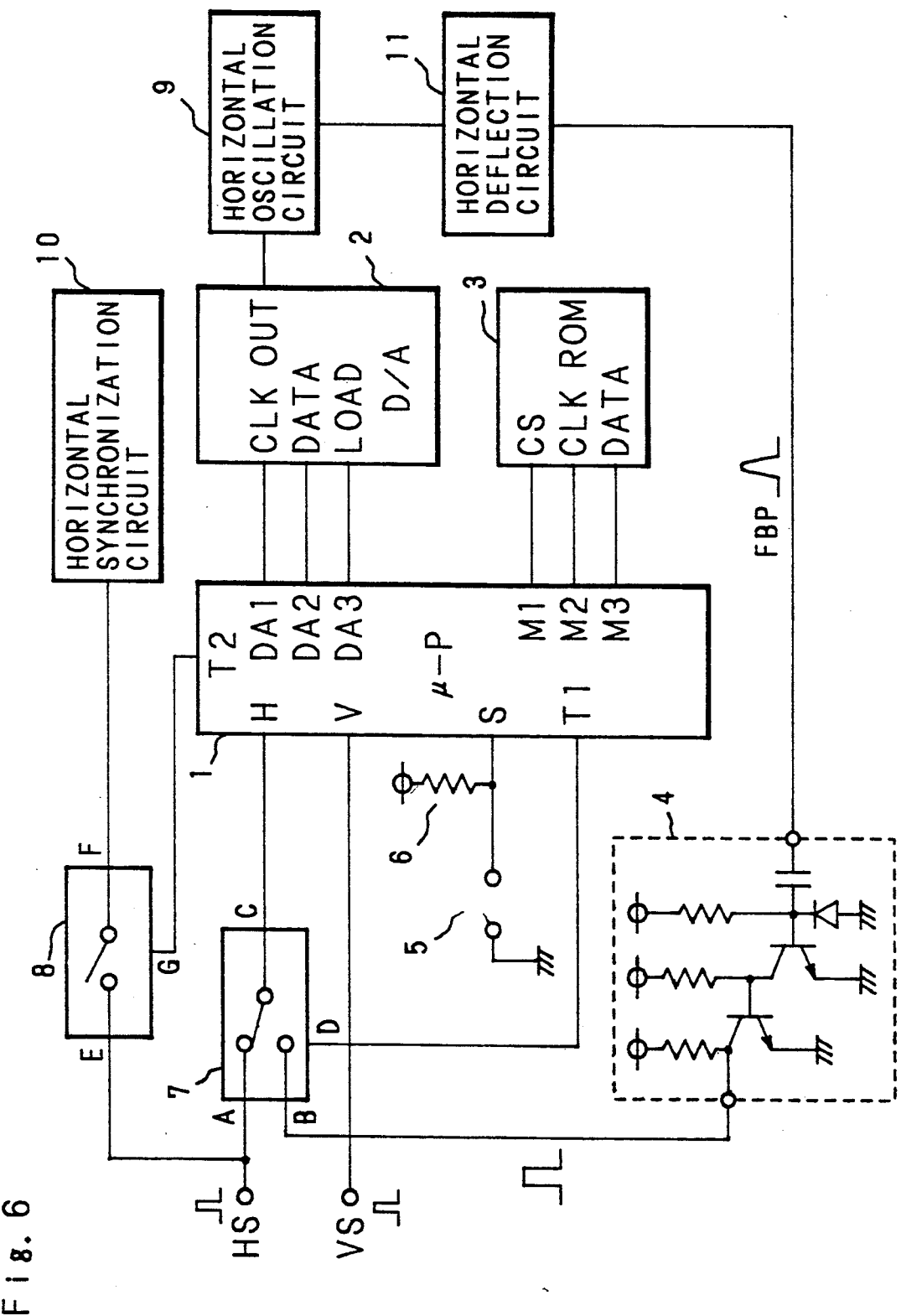
FIG. 6 schematically designates the overall block diagram of an oscillation frequency control circuit embodied by the invention and a peripheral circuit.

FIG. 6 schematically designates the overall block diagram of the oscillation frequency control circuit embodied by the invention and a peripheral circuit. The reference numeral 1 shown in FIG. 6 designates a microcomputer incorporating three input terminals H, V and S and, eight output terminals including DA1, DA2, DA3, M1, M2, M3, T1, and T2. Like the conventional control circuit shown in FIG. 1, those output terminals DA1 through DA3 of the microcomputer 1 are respectively connected to those input terminals CLK, DATA and LOAD of a digital-to-analog (D/A) converter IC 2. An output terminal OUT of the D/A converter IC 2 is directly connected to a horizontal oscillation circuit 9. On the other hand, those output terminals M1 through M3 of the microcomputer 1 are respectively connected to those input terminals CS, CLK and DATA of a non-volatile memory EEPROM 3.

The input terminal H of the microcomputer 1 is connected to an output terminal C of an analog switch 7 which switches signal for supply to the input terminal H of the microcomputer 1. In addition to the output terminal C, the analog switch 7 also incorporates those input terminals A, B and D. The horizontal synchronizing signal HS is supplied to the input terminal A of the analog switch 7. The input terminal B is connected to a waveform-shaping circuit 4, which shapes waveform of signal of flyback pulses FBP outputted from a horizontal deflection circuit 11 driven by the horizontal oscillation circuit 9. The waveform-shaped signal of flyback pulses FBP is supplied to the input terminal B of the analog switch 7. On the other hand, the input terminal D of the analog switch 7 is connected to the output terminal T1 of the microcomputer 1. The analog switch 7 is activated as soon as the input terminal D receives signal from the output terminal T1.

An input terminal G of another analog switch 8 is connected to the output terminal T2 of the microcomputer 1. On receipt of signal from the output terminal T2 via the input terminal G, the analog switch 8 is activated. The horizontal synchronizing signal HS is supplied to another input terminal E of the analog switch 8. An output terminal F of the analog switch 8 is connected to a horizontal sychronization circuit 10. One end of an operation switch 5 is connected to the input terminal S of the microcomputer 1, where the operation switch 5 switches operating modes from the normal operation mode to the corrective operation mode and vice versa. The one end of this operation switch 5 is also connected to a pull-up resistor 6, whereas the other end of the operation switch 5 is grounded. Like the conventional control circuit cited above, the vertical synchronizing signal VS is supplied to the input terminal V of the microcomputer 1.

Figure 7A:
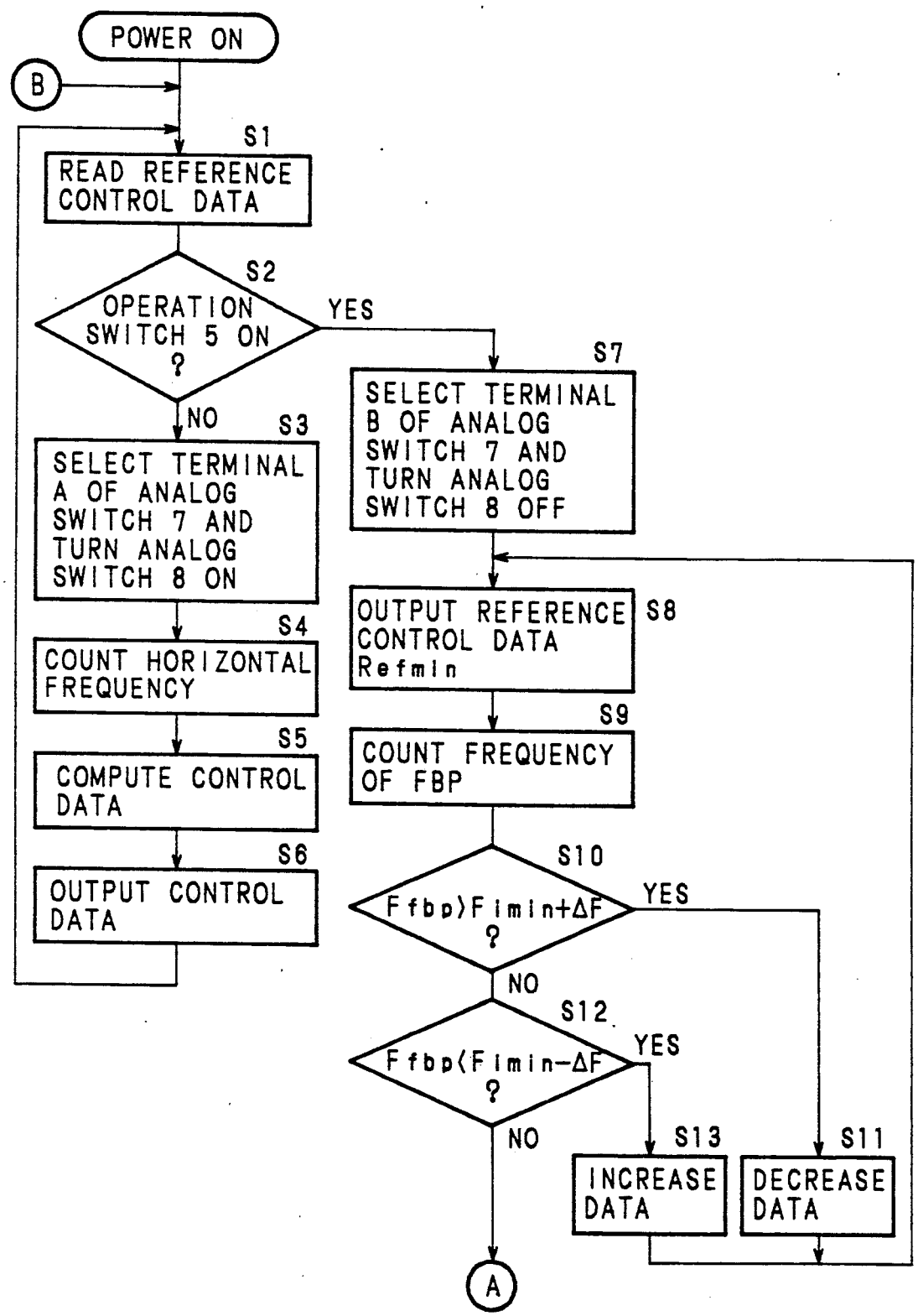
FIG. 7 designates the operating flowchart which is explanatory of the functional operation of the control circuit shown in FIG. 6.
Figure 7B:
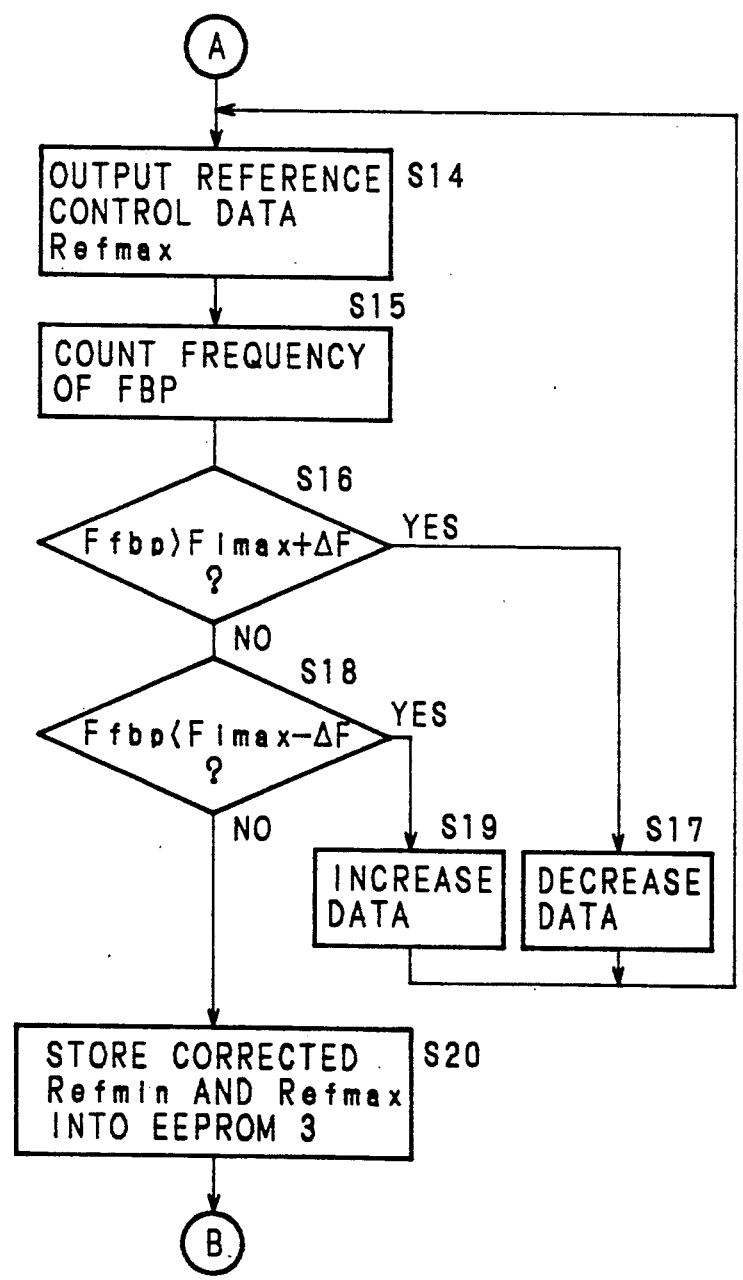

Next, referring to the operating flowchart shown in FIG. 7, functional operation of the oscillation frequency control circuit embodied by the invention is described below. First, normal operation mode is described below.

While the normal operation mode is underway, the operation switch 5 remains open. When the power is ON and the program of the microcomputer 1 is activated, step S1 is entered, in which the microcomputer 1 reads frequency reference control data Refmax and Refmin stored in the EEP ROM 3. These reference control data Refmax and Refmin are respectively outputted from the EEPROM 3 in correspondence with the maximum value Fimax and the minimum value Fimin in the frequency range of the input horizontal synchronizing signal HS.

Next, step S2 is entered, in which the microcomputer 1 identifies whether the operation switch 5 turns ON or not by referring to the potential of the input terminal S. Since the operation switch 5 is OFF, step S3 is entered, in which the microcomputer 1 starts to operate itself, and then, acting on the instruction supplied from those output terminals T1 and T2 of the microcomputer 1, the analog switch 7 selects the input terminal A and the other analog switch 8 is turned ON. Next, step S4 is entered, in which the horizontal synchronizing signal HS is supplied to the input terminal H of the microcomputer 1, and then the horizontal synchronizing signal HS is counted for a predetermined period of time from the rear edge of the vertical synchronizing signal VS before permitting the microcomputer 1 to compute frequency Fin of the input horizontal synchronizing signal HS.

Figure 8:
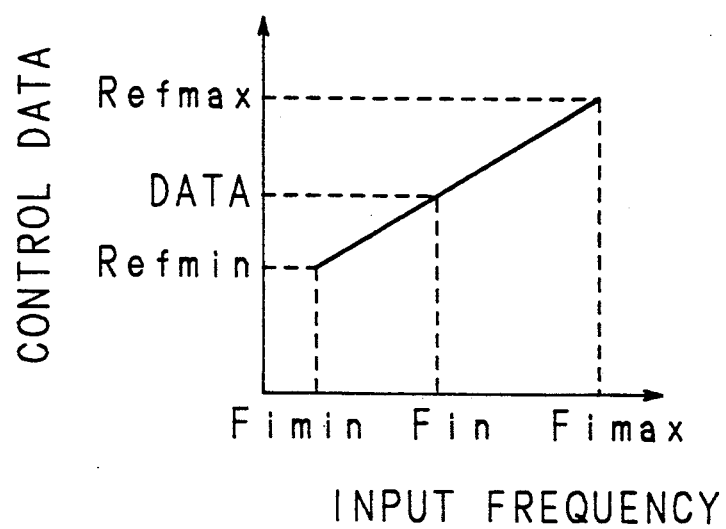
FIG. 8 graphically designates the method of computing the frequency control data DATA on the basis of the frequency Fin of the input horizontal synchronizing signal HS.

Next, step S5 is entered, in which the microcomputer 1 computes a frequency control data DATA on the basis of the frequency Fin and the data stored in the EEPROM 3, in other words, these control data Refmax and Refmin respectively corresponding to the maximum and minimum frequencies Fimax and Fimin. Concretely, the microcomputer 1 computes the frequency control data DATA by applying an interpolation shown in FIG. 8. Next, step S6 is entered, in which the microcomputer 1 supplies the computed frequency control data to the D/A converter IC 2, which then outputs the received frequency control data to the horizontal oscillation circuit 9. Thenceforth, the oscillation frequency control circuit repeats those sequential processes of step S1 through step S6 to constantly control the oscillation frequency of the horizontal oscillation circuit 9 in accordance with the frequency of the horizontal synchronizing signal HS.

Next, the corrective operation mode is described below. While the corrective operation mode is underway, the operation switch 5 remains ON, and thus, the operating mode proceeds from step S2 to step S7. While step S7 is underway, the microcomputer 1 is activated. As soon as the potential of the input terminal S of the microcomputer 1 is reduced to zero, the analog switch 7 is activated, and then the input terminal A is switched over to the input terminal B and simultaneously the analog switch 8 is turned OFF. Next, step S8 is entered, in which the reference control data Refmin is supplied to the D/A converter IC 2. Next, step S9 is entered, in which the frequency Ffbp of the flyback pulse FBP output from the horizontal deflection circuit 11 is counted by applying internal reference clock system.

Next, step S10 is entered, in which the microcomputer 1 makes a comparison between the value of frequency Ffbp and the sum of Fimin and $\Delta F$ (this is a predetermined plus error allowable amount). If the value of frequency Ffbp is in excess of the sum of Fimin and $\Delta F$, then step S11 is entered, in which a certain amount is decreased from the Refmin, and then the operating mode returns to step S8. On the other hand, if the value of frequency Ffbp is not larger than the sum of Fimin and $\Delta F$, then step S12 is entered, in which the microcomputer 1 makes a comparison between the value of Ffbp and the value of Fimin $+\Delta F$. If the value of frequency Ffbp is less than that of Fimin $-\Delta F$, then step S13 is entered, in which a certain amount is added to the Refmin, and then the operating mode is again back to step S8.

After repeatedly executing those processes described above for increasing and decreasing the amount of the reference control data Refmin, the frequency Ffbp is soon converged in a range of Fimin $\pm 66$ F. When step S12 is entered, no further process is executed, thus completing the corrective processes by way of dealing with the minimum frequency.

Next, the operating mode shifts to the other corrective processes for dealing with maximum frequency. In place of the reference control data Refmin made available for the above processes, the other reference control data Refmax is supplied to the D/A converter IC 2 on the way of executing step S14. Next, step S15 is entered, in which the frequency Ffbp of flyback pulse FBP outputted from the horizontal deflection circuit 11 is counted. Next, step S16 is entered, in which the microcomputer 1 makes a comparison between the frequency Ffbp and the sum of Fimax and $\Delta F$. If the value of the frequency Ffbp is in excess of the sum of Fimax and $\Delta F$, then step S17 is entered, in which a certain amount is decreased from the reference control data Refmax, and then the operating mode returns to step S14. If the value of the frequency Ffbp is not larger than the sum of Fimax and $\Delta F$, then step S18 is entered, in which the microcomputer 1 makes a comparison between the frequency Ffbp and Fimax $-\Delta F$. If the value of the frequency Ffbp is less than that of Fimax $-\Delta F$, then step S19 is entered to add a certain amount to the reference control data Refmax, and then the operating mode returns to step S14.

After repeatedly executing those sequential processes described above for increasing and decreasing the amount of the reference control data Refmax, the frequency Ffbp is soon converged in a range of Fimax $\pm \Delta F$. When step S18 is entered, no further process is executed. Next, step S20 is entered, in which those correction-completed reference control data Refmax and Refmin determined in the course of executing above processes are respectively rewritten in the EEPROM 3 by way of replacing the initially-set reference control data.

As is clear from the above description, whenever executing a corrective operation to cancel deviation of input-output frequencies caused by fluctuation of the circuit constant, the control circuit embodied by the invention can securely execute all the corrective processes merely be activating operation of the operation switch 5. Thenceforth, this corrective routine is automatically and sequentially executed in the control circuit itself. This is turn eliminates an externally applied corrective operation thus far conventionally executed. In consequence, the oscillation frequency control circuit embodied by the invention can securely achieve a high-precision corrective operation without involving difficulty and inconvenience at all.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An oscillation frequency control circuit which executes a normal operation to control an oscillation frequency of a horizontal oscillation circuit driving a horizontal deflection circuit generating flyback pulses in accordance with the frequency of horizontal synchronizing signal supplied to a display unit and on the basis of a frequency control data corresponding to the frequency of horizontal synchronizing signal and a corrective operation to correct said frequency control data comprising:
   a detecting means for detecting the frequency of an input signal;
   a switching means for switching the input signal over to said detecting means in order that said horizontal synchronizing signal is supplied to said detecting means in said normal operation and said flyback pulse of said horizontal deflection circuit is supplied to said detecting means in said corrective operation;

a memory means for storing the frequency control data corresponding to the frequency of certain horizontal synchronizing signal;

a computing means for, in said normal operation, computing a frequency control data corresponding to the frequency of input horizontal synchronizing signal on the basis of the detected result of said detecting means and the data stored in said memory means; and a corrective means for, in said corrective operation mode, making a comparison between the detected result of said detecting means in the course of supplying said data stored in said memory means to said horizontal oscillation circuit and the frequency of said certain horizontal synchronizing signal and correcting said frequency control data in order that the difference between the compared values is reduced to a level below a predetermined value.

2. An oscillation frequency control circuit as set forth in claim 1, wherein the frequency control data which said memory means stores is a frequency control data corresponding to maximum and minimum frequencies of horizontal synchronizing signal.

3. An oscillated frequency control circuit as set forth in claim 2, wherein the frequency control data which said corrective means corrects is a frequency control data corresponding to maximum and minimum frequencies of horizontal synchronizing signal.

4. An oscillation frequency control circuit as set forth in claim 2, wherein said computing means includes a means for executing computation by applying an interpolation on the basis of the frequency control data corresponding to maximum and minimum frequencies of horizontal synchronizing signal.

5. An oscillation frequency control circuit as set forth in claim 1, further comprising a means for rewriting the frequency control data stored in said memory means into the frequency control data corrected by said corrective means.

6. An oscillation frequency control circuit as set forth in claim 1, further comprising a means for shaping waveform of said flyback pulse to be supplied to said detecting means.

* * * * *